Jan. 20, 1970   H. T. OAKLEY ET AL   3,490,934
METHOD OF COATING METAL ARTICLES
Filed Feb. 2, 1966   2 Sheets-Sheet 1

HOWARD T. OAKLEY
AUGUSTUS B. SMALL   INVENTORS

BY *Dail A. Roth*

ATTORNEY

HOWARD T. OAKLEY
AUGUSTUS B. SMALL   INVENTORS

United States Patent Office 3,490,934
Patented Jan. 20, 1970

3,490,934
METHOD OF COATING METAL ARTICLES
Howard T. Oakley, 26 Highlander Drive, Scotch Plains, N.J. 07076, and Augustus B. Small, 532 Colonial Ave., Westfield, N.J. 07090
Filed Feb. 2, 1966, Ser. No. 524,392
Int. Cl. B44c *1/08;* B44d *1/36*
U.S. Cl. 117—18                         15 Claims

ABSTRACT OF THE DISCLOSURE

A metal article such as a pipe, is coated with an initial layer of thermosetting resin at an elevated temperature so that the solvent in which the resin is contained is flashed off. The metal article is subsequently coated with a mixture of thermosetting resin, a silane and extremely finely ground particles, such as quartz particles, and the entire resulting coating is subsequently cured in order to form a continuous cured coating which is highly resistant to abrasion.

---

This invention relates to a method of applying protective coatings to metal articles and to the articles so produced. In its greatest particularity, it relates to methods of coating metal pipes which are to be used for underground pipelines and the invention will be described further herein with respect to metal pipes as a specific preferred embodiment although it is to be expressly understood that the invention is not so limited.

External coatings are applied frequently to pipelines intended to carry liquids such as hydrocarbons and to be buried in the soil. These coatings have the primary purpose of protecting such pipelines against external corrosion. They have a secondary purpose of protecting such pipelines against mechanical abrasion from external means such as incurred through shipment and handling or from rocks which may fall on or be driven against or along pipelines during burying operations. Commonly used coating materials are those having a petroleum asphalt or coal tar base. These are applied directly on a pipe surface in thicknesses in the range of 60 to 100 mils, for example, 90 mils. The coating of asphalt or coal tar which constitutes the primary means of protection of the pipeline is ordinarily provided with a wrapping of such materials as kraft paper, asbestos felt, or glass cloth.

Variations are used where the innermost or first layer is from 2 to 5 mils thick and usually comprises an oxidized oily polymer resin which is both resistant to hydrocarbon attack and strongly inhibitive of corrosion, and the next succeeding or second layer from 60 to 100 mils thick comprises petroleum asphalt or coal tar which performs the customary mechanical shielding function.

Asphalt and coal tar base coatings have at least two significant deficiencies for service on pipelines, namely, their lack of impact resistance and their susceptibility to dissolution by hydrocarbon liquids. These liquids will be present to attack a pipeline coating externally if they have saturated the surrounding soil due to a leak or break in the pipeline and its coating or in some other nearby pipeline. Wrapping materials such as those cited will not protect the principal asphalt or coal tar coating from external hydrocarbon attack because these materials are themselves soluble in or permeable by hydrocarbon liquids.

It is possible also for asphalt or coal tar applied on a pipeline to be attacked from the inside out. Such attack will occur if a pipeline carrying hydrocarbon liquid develops a very slow leak. The leaking liquid, even though not emerging with sufficient force to rupture the asphalt or tar pipeline coating, will dissolve the coating locally immediately adjacent the pipe, and continue this action outwardly and along the pipe so long as leakage persists. Hydrocarbon dissolution of a pipeline coating from the inside out is, however, a problem of less importance than that of external dissolution due to hydrocarbon impregnated soil.

Coal tar base coatings are less susceptible to hydrocarbon attack than are those having an asphalt base, but their susceptibility to such attack is still sufficiently great to constitute a noticeable disadvantage of these materials for underground petroleum pipeline service. The ultimate potentially deleterious possibility with either asphalt or coal tar coatings is, of course, that a pipeline will become exposed for local corrosion by chemicals or electrolytic circuits in the soil if a patch of coating be dissolved entirely.

Finding increasing use, however, are thin-mil or thin-film coatings. These coatings are applied in thicknesses of about 30 mils or less. They include protective tapes, extruded plastic, and fusion-bonded plastic. Most widely employed are extruded-plastic coatings.

Protective tapes are normally made from polyvinyl chloride or polyethylene, and can be applied both in the field and in the mill. Extruded plastic coatings can be mill-applied only. A good example of an extruded coating is Republic Steel's X-Tru-Coat plastic coated pipe. First an elastic adhesive base coat is applied hot to the pipe. Then, high-density polyethylene is extruded on the base coat. These are relatively expensive coatings.

Fusion-bonded plastic coatings—coatings applied by heating the pipe and contacting it with resin powder which fuses to the pipe—are also limited to mill application. Epoxy resin is generally used.

One advantage of the present invention is that it not only provides a method of protecting metal articles, particularly petroleum carrying pipelines, against corrosion but concomitantly a coating is formed on the article which will be resistant to mechanical damage from external means, and will present both an indissoluble barrier to hydrocarbon attack from without and an indissoluble barrier to such attack from within. In accordance with a preferred embodiment of this invention, an improved method of applying a protective coating to pipelines, particularly those for carrying hydrocarbon liquids, is described as follows.

Metal articles, particularly pipes, after being coated with the process of the invention, posses coatings which are tough, and resist abrasion, and can be pushed or driven into the ground without peeling or tearing the coating. Moreover, the coatings are especially resistant to the corrosive effects of soil and weather, they have adhesion strengths of greater than 3,000 p.s.i., and are free from coating voids as determined by a holiday detector. Moreover, the properties of impact resistance, electrical resistance, cathodic disbondment resistance (undercutting resistance) and hardness are all excellent.

The invention can be more fully understood from the following description read with reference to the accompanying drawings in which.

Figure 1:
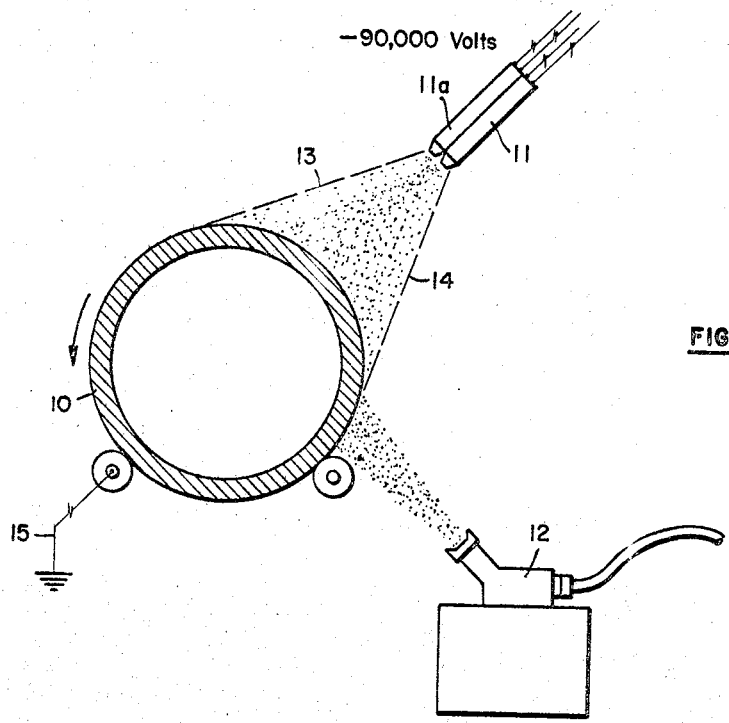
FIGURE 1 is a schematic illustration of the process as applied to a pipe.

The invention is further described in brief by reference to FIGURE 1. A clean pipe, a cross section of which is shown schematically in the figure as item 10, is preheated. While the pipe is rotated, an initial application of a polymer or polymer in solvent is sprayed on by means of spray apparatus shown schematically as 11. Depending on how fast the solvent evaporates, the spraying can be substantially continuous or can be intermittently timed with each rotation so that there is a pause of a few seconds between sprayings at the end of every rotation to allow the solvent to flash off before the next spray application. After the initial application of a polymer is applied to a thickness of about 6 mils, the same polymer coating material but having a silane (usually dissolved) therein is then applied as a spray by means of a spray apparatus similar to spray apparatus 11 which is illustrated schematically as 11a in the drawing. One spray apparatus can be used for both applications but two are preferred. Simultaneously with the silane containing spray, a fine silica powder is dusted on by a suitable means such as flock gun 12, i.e., means for spraying fine particulate powders.

Figure 2:
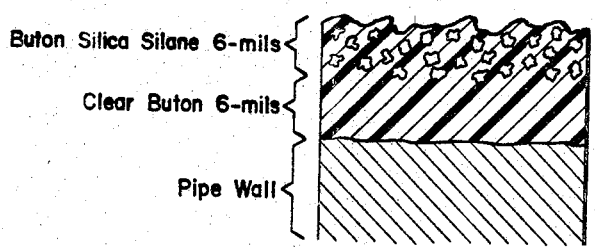
FIGURE 2 is a cross section of the resulting coating.

When the required total thickness of coating materials is attained, the entire composite resultant coating is cured to form a solid protective coating of about 6 to 30 mils in thickness. The resultant coating is a continuous coating, preferably a Buton film with silica embedded in the outer portion. See FIGURE 2 for a cross-sectional view of a cut of the coating and pipe.

It is to be emphasized that the final coating is one continuous resin matrix with filler particles (silica) embedded in the top portion thereof. The initial application of resin with no silica is essential since a silica-buton combination fails rapidly under cathodic protection. This might be because the silica is hydrophilic. At any rate, the concept of the invention is to have the initial 3 to 8 mils of the coating free from silica.

The metal pipe is cleaned by means of standard techniques known to the art such as shot blasting, sand blasting, grit blasting, pickling, wire brushings, combinations of the foregoing methods and the like.

The temperature at which the pipe is preheated and maintained is quite critical and ranges generally from 350° to 500° F., preferably 400° to 500° F., and more preferably 450° to 500° F. The reason for this is that it must be hot enough to cause a rapid evaporation of the solvent, but not hot enough to result in a rapid cure rate. Thus, the polymeric material on the pipe prior to the final curing step will have been cured to no more than an early state of cure in which it has retained some of its flow characteristics. If the cure rate is too rapid, cratering of the coating will result. The pipe also must be hot enough so that the filler material, i.e., silica, will stick to and be integrated in the coating The relative thickness of the coating further compounds the difficulty in solving this complex problem.

The spraying is controlled so that sequential sprays are separated by an interval of time sufficient to flash off most of the solvent. This will generally require from about 5 to 15 seconds depending on the boiling point and flash point of the particular solvent being used. This is a very important aspect of this invention.

The pipe is rotated at a surface speed of about 30 to 500 f.p.m., preferably 30 to 300 f.p.m., and most preferably about 60 to 120 f.p.m. (f.p.m.=feet per minute in rotational movement.)

Generally, the class of polymers that can be used includes any thermosetting polymers that are sprayable or can be made sprayable by forming a solution or emulsion, which polymers will cure in the atmosphere. Suitable examples include epoxies and polyesters.

The preferred fluid coating composition can be generally described as an air-blown polymer prepared from diolefins, particularly those having 4 to 6 carbon atoms per molecule, such as butadiene, isoprene, dimethyl butadiene, piperylene and methyl pentadiene. Diolefins as described above copolymerized with minor amounts of ethylenically unsaturated monomers such as styrene, acrylonitrile, methyl vinyl ketone, or with substituted styrene, such as those having alkyl groups substituted on the rings, paramethyl styrene dimethyl styrene, can also be used.

A preferred diolefin polymer is one prepared by reacting 75 to 100 parts of butadiene and 25 to 0 parts of styrene in the presence of metallic sodium catalyst. Polymerization is carried out in a reaction diluent at temperatures from about 25° to 105° C. with about 0.5 to 5 parts of finely divided sodium per 100 parts of monomers used. The diluent used in the polymerization must boil between about −15° and 200° C. and is used in amounts ranging from 100 to 500 parts per 100 parts of monomers.

Preferrred diluents are aliphatic hydrocarbons such as solvent naphtha or straight-run mineral spirits such as Varsol. In order to obtain a water-white product, a co-diluent, in amounts of about 10 to 45 parts per 100 parts of monomers, may also be used, consisting of a $C_4$ to $C_8$ aliphatic ether or cyclic ethers and polyethers other than those having a —O—C—O— grouping. Particularly useful ethers are dioxane 1,4 and dietheyl ether. Finally, it is beneficial to use about 5 to 35 wt. percent (based on sodium) of an alcohol such as methanol, isopropanol, or an amyl alcohol in order to overcome the initial induction period. The resulting product may vary in viscosity from 0.15 to 20 poises. The preparation of this oil is described in U.S. Patent 2,762,951, which is incorporated herein by reference.

In another method, the polymer can be prepared by aqueous emulsion polymerization in the presence of relatively large amounts of mercaptan modifiers. In still another method, the liquid polymer can be produced in the presence of hydrofluoric acid as the catalyst .The polymer can also be prepared by the use of $BF_3$-ethyl ether complex catalyst as described in U.S. Patent 2,708,639, also incorporated herein by reference; or by the use of a peroxide catalyst such as t-butyl hydroperoxide as described in U.S. Patent 2,586,594, likewise incorporated herein by reference.

Solid polymers are prepared similarly by mass, emulsion and peroxide polymerization, e.g., SBR (an emulsion copolymer of 75% butadiene and 25% styrene) and the like.

The polymers obtained by any of the above methods may be used as synthesized or they may be modified with maleic anhydride in accordance with the teachings of U.S. Patent 2,652,342.

These polymers which are often obtained as oils are then oxidized by blowing them with air or oxygen, preferably in the pressure of a solvent such as aromatic solvents or solvent mixtures having a Kauri Butanol value of at least 40. The choice of solvents will depend upon the oxygen content desired in the finished oil, the formulation of the coating compositions, and the one most economically suitable to achieve the desired results.

These polymers can also be modified by other chemical techniqeus such as epoxidation, hydroxylation, carboxylation and the like.

Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octanoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors such as time, temperature, catalyst and solvent. Preferred compounds are the oxidized copolymers of 75 to 85% butadiene and 25 to 15% styrene with about 5 to 20% oxygen in the structure. These compounds will have a molecular weight of about 2500. This technique of oxygen-blowing has been fully described in U.S. Patent 3,196,121 which is incorporated herein by reference.

Especially preferred are resins which are commercially available from the Enjay Chemical Company as Buton 200 or Buton 300 or as a mixture of Buton 200 and Buton 300, Buton 320 and the like.

Buton 100, the basic resin, is an all-hydrocarbon copolymer with a molecular weight of approximately 8–10,000 and a high degree of unsaturation (iodine number=300). Physically, Buton 100 is a viscous (3,500 poise), clear, almost colorless liquid. Its utility in coatings lies mainly in special applications, such as can linings, thin clear coatings, and as a chemical intermediate in other reactions.

Buton 200 and Buton 300 are prepared by chemically modifying Buton 100 to introduce polar groups such as hydroxyls, carbonyls, and carboxyl groups. The resulting polymers have a new, much more active chemical nature, slightly lower unsaturation, and are supplied in solutions. Buton 200 and 300 extend the range of applications for which Buton 100 is suitable by providing greater compatibility with other resins, better pigment wetting characteristics, and the ability to produce hard films at thicknesses greater than 1.2 mils. Consequently, the Buton family of resins has found application through a wide range of surface coating preparation techniques.

Descriptive characteristics of the three polymers are recorded in Table I. Here it may be noted that Buton 100 is supplied in a solvent free state while Buton 200 and 300, as described above, are supplied in solution. The solvent employed is predominantly aromatic in nature with isopropyl alcohol being employed as a secondary solvent and viscosity stabilizer. Alternatively, oxygenated solvents can be used such as ketones and the like. Buton 320 is an example of a oxygenated polybutadiene prepared and used in methylisobutyl ketone in the process of the invention. Blends of different polymers can also be used. Solutions of the Buton resins have comparatively low viscosities and are readily employed in surface coatings. No significant viscosity increases are noted on storage for periods as long as one year. For most purposes, Buton solutions are sufficiently pale to prepare white and light-colored pigmented products.

TABLE I.—PHYSICAL PROPERTIES OF BUTON RESINS

| Typical Inspections | Buton 100 | Buton 200 | Buton 300 |
|---|---|---|---|
| Nonvolatile matter, wt. percent | 100 | 50 | 45 |
| Solvent Blend, wt. percent: | | | |
| Solvesso Xylol | | | 60 |
| Enjay Isopropyl Alcohol (Anhydrous) | | 25 | 40 |
| Solvesso 100 | | 75 | |
| Specific gravity, 20/4° C | 0.915 | 0.925 | 0.948 |
| Lb./Gallon, 77° F | 7.65 | 7.7 | 7.8 |
| Lb./Gallon, Solids, 77° F | 7.65 | 8.5 | 9.2 |
| Viscosity, Gardner Bubble | [1] C-E | H-L | E-H |
| Color, Gardner, Max | 1 | 7 | 10 |
| Acid Number, mg. KOH/g, Max | | 12 | 16 |
| Flash Point (Tag Open Cup) °F | 200 | 75 | 75 |
| Reducing Solvents | | Aliphatic or Aromatic Hydrocarbons | |

[1] On 50 wt. percent solution in Varsol.

One of the problems solved by the method of the invention is how to favorably resolve antagonistic properties which are inherent in the use of this class of unsaturated compounds. To illustrate, if a resin were to be used as a coating without an oxygen content, it would present serious difficulties with respect to curing in relatively thick films. Therefore, resins of higher reactivity, i.e., the partially oxygen-substituted materials, are preferable, but they have such a high viscosity that it would be impractical and even impossible to apply them by a spraying technique. Thus, it is necessary to use the oxygen-substituted resins in the presence of a solvent, thus complicating the situation by requiring that the solvent be evaporated away from the coated article prior to effecting a cure of the resin on the article.

In the past, the experience was to the effect that solvents would not evaporate very readily from thick film coatings and thus it was impossible to build up a thick film coating from this resin in its oxygenated or nonoxygenated form that could be cured sufficiently well to attain the impact resistance and other properties necessary for coated articles which are subjected to rough usage through both transportation and exposure to nature elements.

Buton 100, a copolymer of 80% of butadiene and 20% of styrene, is too viscous to be sprayed unless used with a solvent. Moreover, if applied in layers over about 2 mils in thickness without modification, it does not cure fast enough or hard enough to make satisfactory coatings.

Both Buton 200 and Buton 300, which are oxidized Buton 100s, are obtained as 50% and 45% solids solution, respectively, in solvent by stripping the reaction diluent. Buton 200 is in Solvesso 100 which can be described as an aromatic portion of platinum hydroformate having the following specifications:

| | |
|---|---|
| Aromatics, vol. percent | 96.45 |
| Olefins, vol. percent | 0.15 |
| Saturates, vol. percent | 3.40 |
| Boiling range, ° F. | 325 to 400 |
| Flash point, ° F. | 116 |
| Specific gravity | 0.8756 |
| Viscosity @ 25° C., cp. | 0.806 |

Buton 300 is in a technical grade of xylol. This is Solvesso Xylol which has the following specifications:

Composition, volume percent:

| | |
|---|---|
| Toluene | 1.9 |
| Xylenes | 96.7 |
| C₈ aromatics | 1.4 |
| | 100.0 |
| Boiling range, ° F. | 281–287 |
| Specific gravity 60/60° F. | 0.8708 |
| Viscosity, centipoises @ 25° C. | 31.0 |
| Refractive index @ 20° C. | 1.4967 |
| Nonvolatile content, g./100 ml. | 0.0006 |

Meets requirements of ASTM D–846.

To prevent cross-linking during storage which causes an undue increase in viscosity and thickness, isopropyl alcohol is usually added to the solvent/polymer solution as an inhibitor.

The curing rate of these polymers is proportional to their oxygen content. Less oxygen and less time is required to cure the Buton 200 or 300 polymers since a large portion of the active sites were formed during the manufacture of Buton 200 or 300 from Buton 100. Therefore, it is not necessary for as much oxygen in the air to work its way through the interior of the film from the film's surface.

Preferably, the procedure is to apply a base coating of the Buton 200 or Buton 300 resin in solvent which coating has a thickness equivalent to a dry film thickness of 3 to 8, preferably 4 to 7, and most preferably about 6 mils. As an optional feature, this resin in solvent may contain from 1 to 5, preferably about 3 molecular layers based on the surface area of the metal article, of a silane which is usually converted to about the ⅓ hydrolyzed form such as the vinyl silane ester of the monomethyl ether of ethylene glycol obtainable commercially from Union Carbide as A–172 vinyl silane or glycidoxy propyl trimethoxyloxy silane which is obtainable commercially from Union Carbide as A–187. They can be used unhydrolyzed, but are preferably partially or fully hydrolyzed by adding additional water before use.

After the initial application of resin is made, an additional coating usually of the same type of resin as the base coating but which must contain a silane of the type described above, is then applied by spraying in the same manner as the initial coating. Sufficient silane is present to coat the silica particles with from 1 to 5, preferably 3 molecular players based on the surface area of the silica. This is about 0.08 to 0.15 or more, preferably 0.095 to 0.12 wt. percent. The silica is powdered on separately but preferably simultaneously with the resin spray. The coating will contain 1 to 90, preferably 40 to 60, and most preferably 45 to 55 wt. percent of a suitable filler material, preferably a finely ground sand or silica based on the weight of the additional coating. Other suitable filler materials can be used such as siliciferous materials, silicon-containing materials, certain inorganic salts, minerals, mica, metals and the like. These can be in the form of crystals, powders, flakes, beads, needles, whiskers and other finely comminuted forms. Small glass spheres or beads such as those sold by Flex-o-Lite Manufacturing Corp. under the trade name Blast-O-Lite Industrial Glass Beads, can also be used.

A particularly preferred material is commercially obtainable as Supersil, which is manufactured by the Pennsylvania Glass Sand Company. Also, the finely ground silica is sometimes referred to as silica flour. Very fine mesh sand may also be used. Generally, the particle size of this filler material will range from 1 to 100 microns. The proportions of sizes within this range can very widely.

Preferably, the silica or other filler material is applied by a different spray means than the spray means which is used to apply the resin. Thus, in one preferred embodiment of the invention, the filler material is not mixed in with the resin, silane and solvent composition used to form a coating, but is applied to the pipe with a separate spray means in such a manner that all three components are applied simultaneously. Alternately, the filler material and the resin/silane solvent composition can be applied with different spray means being used for each but in alternate coatings.

Thus, if one visualizes a pipe turning at a certain surface speed, preferably 60 to 120 f.p.m., the especially preferred process sequence is to first apply a base coating until the base layer builds up to a thickness that will produce a 3 to 8 mils thickness of silica-free coating in the total composite coating after curing; then a coating of resin plus silane during one complete revolution of the pipe and then spraying a filler material, preferably silica, upon the next revolution of the pipe. (It can be done simultaneously as well.) This sequence is followed until the outer protective portion containing silica has a thickness varying between 3 to 30 mils, preferably 4 to 20 mils and most preferably 5 to 10 mils in thickness in the total composite coating after curing.

There is an empirical rule of thumb for the speed of rotating the pipe. It is based on the peripheral speed and must be chosen so that the coating will not be slung off by the surface velocity as it is applied. For instance, a pipe 3 ft. in diameter rotating at 200 r.p.m. would throw coating whereas one 3 inches in diameter would not.

Once the desired thickness of the outer protective coating has been attained, the complete coating which includes both the base coating and the outer protective coating are cured by heating to a temperature of 300° to 700° F., preferably 325° to 650° F., and most preferably between 350° and 600° F. for a period of 1 to 120 minutes, preferably 10 to 80 minutes, and most preferably for 15 to 60 minutes. The curing temperature and time are interdependent and one may be increased to some extent while the other is concomitantly reduced and vice versa. Also, these factors will vary depending on the particular resin used since the chemical reactivity of resins will vary and also the solvent used to carry the particular resin will have an effect on these factors. The particular conditions necessary to achive a satisfactory cure will be apparent to one skilled in the art having the benefit of the present disclosure.

The silanes useful in the instant invention are defined by the following general structure:

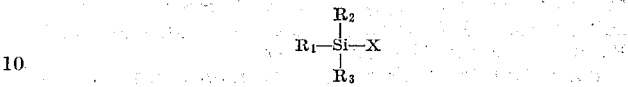

wherein $R_1$ is selected from the group consisting of alkenyl, aminoalkyl, epoxyalkyl, epoxyaryl, epoxyaralkyl, epoxycycloalkyl, mercapto-alkyl, acryloxyalkyl, and methacryloxyalkyl; X is selected from the group consisting of halogen, hydroxyl, acyloxy and alkoxy; and $R_2$ and $R_3$ are each independently selected from the group consisting $R_1$, X and methyl. Specific suitable compounds are as follows:

gamma amino-propyl-triethoxysilane,
beta amino-ethyl-triethoxysilane,
gamma amino-propyl-trimethoxysilane,
gamma acryloxypropyl trimethoxysilane,
gamma methacryloxypropyl dimethyl chlorosilane,
gamma (methacryloxyethoxy) propyl trimethoxysilane,
gamma methacryloxypropyl methyl diacetoxysilane,
vinyl trichlorosilane,
vinyl dimethylchlorosilane,
vinyl tris-2-methoxyethoxy silane,
divinyl dichlorosilane,
trivinyl chlorosilane,
divinyl diethoxysilane,
allyl trimethoxysilane,
allyl trichlorosilane,
allyl tris-2-methoxyethoxysilane,
gamma glycidoxypropyl trimethoxysilane,
beta(3,4-epoxy cyclohexyl)ethyl trimethoxysilane.
beta methacryloxyethyl trimethoxysilane,
gamma methacryloxypropyl trimethoxysilane,
beta glycidoxyethyl triethoxysilane,
beta(3,4-epoxy cyclohexyl)ethyl tri(methoxyethoxy)silane,
beta(3,4-epoxyethyl phenyl)ethyl trimethoxysilane,
beta(epoxyethyl)ethyl triethoxysilane,
4,5-epoxy-n-hexyl trimethoxysilane,
15,16-epoxy-n-hexadecyl trimethoxysilane,
3-methylene-7-methyl-6,7-epoxy octyl trimethoxysilane,
N,N-bis(hydroxyethyl)aminopropyl triethoxysilane,
glycidoxy-propyl-trimethoxysilane,
beta mercaptoethyl trimethoxysilane,
beta mercaptopropyl trimethoxysilane,
gamma mercaptopropyl trimethoxysilane,
beta(2-mercapto cyclohexyl)ethyl trimethoxysilane,
beta mercaptoethyl triethoxysilane,
gamma mercaptopropyl dimethyl methoxysilane,
beta mercaptoethyl triacetoxysilane, and the like. The essential feature all silanes useful in this invention possess is a functionality which permits them to engage either in a cross-linking reaction or a copolymerization reaction. This may require some catalytic prompting. In case of these compounds one or more of the $R_2$, $R_3$ or X groups must be hydrolyzed to an (OH) group prior to or after contacting the filler surface. When applied in aqueous dispersion it is likely that all such R and X groups are converted to (OH) groups and these in turn may be converted, at least in part, to siloxane compounds. All of the above silanes are effective even with minute amounts of water and are at least partially converted into the corresponding silanols which may also then be partially converted into their condensation polymers, the siloxanes. Condensation products of the hydrolyzed or partially hydrolyzed silane esters (siloxanes) as well as the silanols are usually believed to be present.

The amount of silane will be from 0.2 to 2, preferably 0.4 to 0.9 wt. percent based on the total weight of the resin composition. Generally, from 0.1 to 2, preferably 0.3 to 0.75 wt. percent of silane, silanol or siloxane is deposited on the filler surface based on the weight of the filler. The silanes, silanols and siloxanes will be referred to for convenience as "silanes."

There are many commercially available spraying apparatus which are suitable for use in this invention to spray the solution of resin and solvent. It is especially preferred that the spraying be carried out in the presence of an electrostatic field. Thus, an electrostatic paint sprayer is particularly suitable. One that is particularly preferred and was also used in the examples of this specification is a hot airless electrostatic paint sprayer which was obtained from the Nordson Corporation of Amherst, Ohio. The use of such spray equipment not only results in highly satisfactory coating but also has economic advantages since material losses due to overspray are greatly reduced. This electrostatic spray technique creates a potential of 50,000 to 90,000 volts between the spray gun and the article to be sprayed, i.e., the pipe. The electrostatic field is shown schematically as that encompassed by the dotted lines 13 and 14 of FIGURE 1. Moreover, the use of the electrostatic field requires a ground wire which is illustrated in FIGURE 1 as item 15.

Several other factors have been found to give improved results in the process. One of these is that when the electrostatic element of the resin spray gun is kept electrically charged even though no resin is being sprayed but while the silica or filler is being applied, the coatings obtained are considerably better than those obtainable when the electrostatic element is turned off. Moreover, while it is possible to apply the silica from any convenient direction, it is preferably sprayed at a right angle to the direction of spray from the electrostatic spray gun measured with respect to the center longitudinal axis of the pipe. Also, the relationship of the silica spray means 12 is preferably as shown in FIGURE 1 with respect to the direction of rotation of the pipe. Thus, as the filler material is sprayed in the direction of the pipe, it is caught up by the electrostatic field from the resin spray means and moved away from both spray means by the direction of turn of the pipe.

In one embodiment, the process can be carried out in a preheat oven and a curing oven. Suitable ovens are obtained from several manufacturers including Despatch Oven Co. and preferably have a dimension of about 67 feet x 54 feet and are heated by either natural gas or fuel oil.

Figure 3:
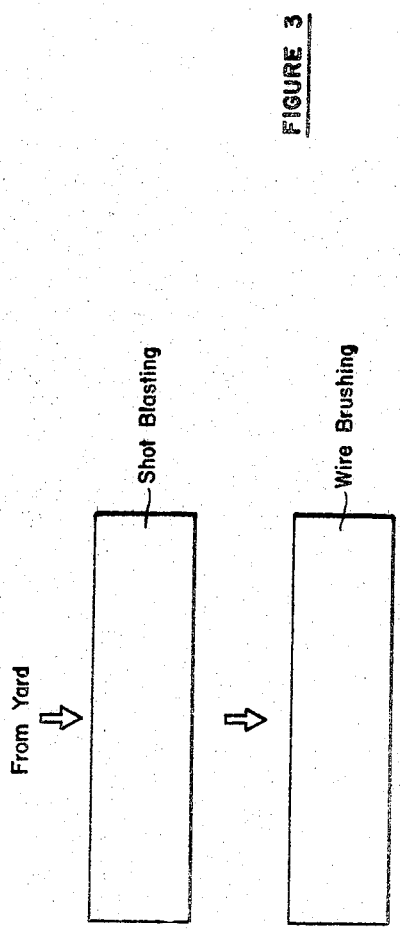
FIGURE 3 is a schematic illustrating the flow of process sequences.
Figure 3:
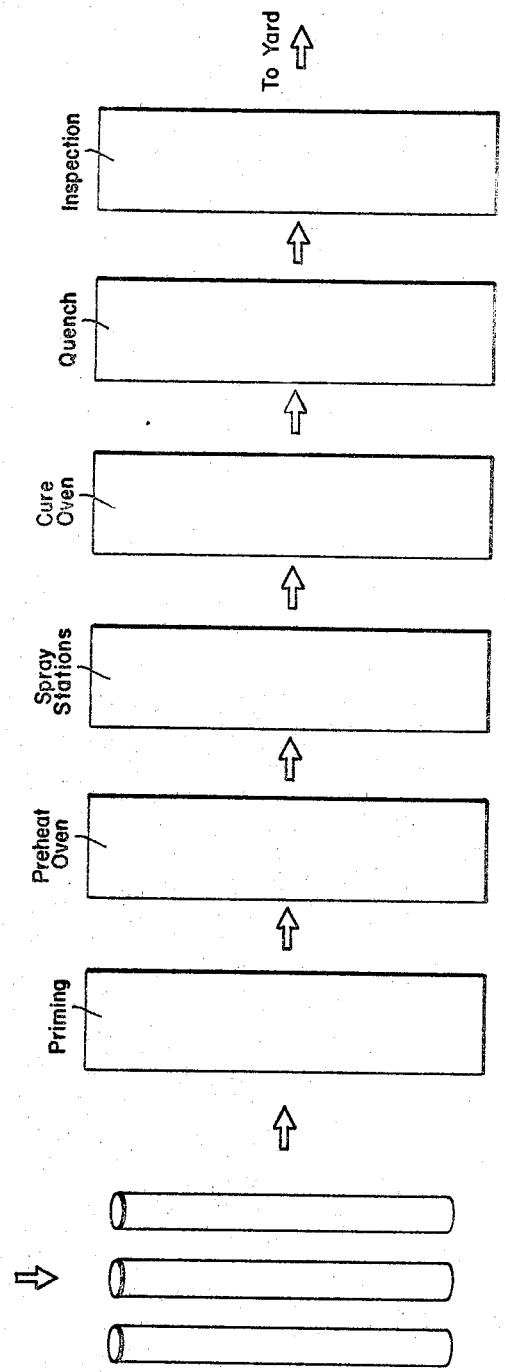

It has also been found and forms an improved facet of this invention that the direction of movement of the article or pipe through the oven is important. Thus, if a pipe is moved in a transverse direction through the oven rather than in a longitudinal direction, a substantial increase in throughput has been obtained. For instance, for a pipe with a 16 inch diameter, the transverse movement results in a throughput of 2200 linear f.p.h. compared with 900 f.p.h. for the longitudinal direction. This is made clear schematically in FIGURE 3 which also gives a complete flow sequence for the process of this invention. Priming as shown in FIGURE 3 is optional and can be accomplished with conventional metal primers.

The invention is further illustrated by the following examples.

EXAMPLE 1

A 6 inch diameter pipe, about 2 feet long, was coated with Buton 300 containing 0.37 wt. percent of A-172 vinyl silane based on the weight of Buton using a process sequence according to that described above wherein the resin sprayer was from the Nordson Corporation and the filler sprayer was a flock gun obtained from the DeVilbiss Company which sprayed a silica flour having a particle size of 5 to 100 microns and obtained from Pennsylvania Glass Sand Co. as Supersil 200. The particle size distribution of their Supersil was as follows:

| Percent finer than: | Particle size, microns |
|---|---|
| Trace retained (100 mesh) | 149 |
| Trace retained (120 mesh) | 125 |
| 99.7 (140 mesh) | 105 |
| 9.6 (160 mesh) | 89 |
| 98.3 (200 mesh) | 74 |
| 94.1 (270 mesh) | 53 |
| 85.2 (325 mesh) | 44 |
| 83.5 | 40 |
| 73.0 | 30 |
| 56.7 | 20 |
| 45.5 | 15 |
| 32.3 | 10 |
| 19.5 | 6 |
| 12.5 | 4 |

The operating conditions are summarized below in Table II(A) and the properties of the coating are summarized below in Table II(B).

TABLE II.—PIPE COATING BASED ON BUTON 300
(0.37 wt. percent A-172)

(A) Operating conditions:
| | | |
|---|---|---|
| Initial temperature of pipe | ° F | 500 |
| Buton base coat | mils | 5 |
| Cure temperature | ° F | 400 |
| Time to apply coating | mins | 13 |
| Temperature after coating | ° F | 275 |
| Time to reach cure temperature | mins | 11 |
| Time at cure temperature | mins | 16 |
| Surface speed of pipe | f.p.m | 90 |

(B) Properties:
| | | |
|---|---|---|
| Thickness, mils | mils | 9–10 |
| Impact, Gardner | in.-lbs | >160 |
| Holidays @ 2000 volts | | 0 |
| Gravelometer test | holidays | 5 |
| Undercutting | ins | 0.12 |
| Bending | ins | 0.10 |
| Microscopic examination, at 30X | | bubble-free |
| Pencil Hardness | | >7H |

It can be seen that a coating of excellent properties was obtained with especially outstanding impact resistance and hardness.

EXAMPLE 2

The same type of pipe and spraying technique and equipment was used as described in Example 1 and the foregoing specification to place a coating on the pipe. The resin used to form the coating had a formulation as follows in Table III:

TABLE III

Formulation:
| | |
|---|---|
| Buton 300, parts by wt. | 3 |
| Buton 200, part by wt. | 1 |
| A-172, wt. percent based on total Butons | 0.37 |

(A) Operating conditions:
| | | |
|---|---|---|
| Initial temperature of pipe | ° F | 500 |
| Buton base coat | mils | 5 |
| Cure temperature | ° F | 450 |
| Time to apply coating | mins | 10 |
| Temperature after coating | ° F | 350 |
| Time to reach cure temperature | mins | 20 |
| Time at cure temperature | mins | 30 |
| Surface speed of pipe | f.p.m | 90 |

(B) Properties:
| | | |
|---|---|---|
| Thickness | mils | 11–12 |
| Impac, Gardner | in.-lbs | 150–160 |
| Holidays @ 2000 volts | | 0 |
| Gravelometer test | holidays | 0–12 |
| Undercutting | ins | 0.33 |
| Bending | ins | 0.08 |
| Microscopic examination, at 30X | | bubble-free |
| Pencil hardness | | 3H |

As can be seen from the above itemization of properties, the coatings applied by the technique of the invention showed outstanding properties in impact and pencil hardness and were satisfactory in the other major property categories.

EXAMPLE 3

This example demonstrates that a mixture of silica and Buton can be successfully applied to a pipe simultaneously. A silica filled Buton 300 containing 67 wt. percent of silica based on total solids having a particle size of 5 to 100 microns and also containing 0.01 wt. percent of a silane obtainable commercially as glycidoxypropyltrimethyloxysilane was applied to a 6 inch pipe using the Nordson spray equipment described above. Virtually no overspray was observed during the spraying periods. A coating of 12 to 14 mils thick of Buton and silica was attained which had a direct impact resistance greater than 650 inch-pounds. The test was carried out by dropping a 9 lb. shot of iron metal from 6 feet above the pipe. The same coating also passed a 67.5 volt (wet) and a 2000 volt (dry) Holiday test both before and after impact.

EXAMPLE 4

The procedure of Example 1 was repeated exactly except that Buton 320 is used instead of Buton 300. Buton 320 is supplied at 50% solids in a 9:1 mixture of methyl isobutyl ketone and isopropyl alcohol and has been oxygenated in these oxygenated solvents. Its density is in the range of 7.45 to 7.65 lbs./gal. and has a maximum color of 5 on the Gardner scale.

EXAMPLE 5

Example 1 is repeated exactly except that in place of the silica flour, Blast-o-lite Glass Beads are used, size number BLXX22, which have typical properties as follows:

| | |
|---|---|
| Material | Soda-lime-Silica glass. |
| Shape | Spheres (over 95% true count with a 100X microscope). |
| Specific Gravity | 9.5. |
| pH (surface) | 2.2–2.3. |
| Free Moisture | 0.1% (Max.). |
| Refractive Index | 1.5 approx. |
| Color (GE) percent | 70%. |
| Oil Absorption (ASTM D281–31) | 1.6. |
| Bulking Values (Lb./gallon) | 11 to 12. |
| Average particle sizes | 17.8 microns. |
| Residue, 325 mesh percent | 2. |
| Residue, 270 mesh percent | 0. |

Although the invention has been described with some degree of particularity, it will be understood that variations and modifications can be made therein without departing from the spirit of the invention as hereinafter claimed.

What is claimed is:

1. An approved method for coating metal articles which comprises in combination the steps of:
   (a) spraying a metal article with a composition comprising a thermosetting resin or a thermosetting resin in a carrier media until said article has a coating having a dry film thickness of from 3 to 8 mils,
   (b) spraying the coated article with a finely divided filler material having a particle size of from 1 to 100 microns;
   (c) spraying the coated article with said thermosetting resin composition which also contains from 0.08 to 0.15 or more weight percent of an organic silane based on the weight of said resin composition, wherein the temperature of said metal article is regulated so as to achieve and maintain its temperature sufficiently high as to drive off substantially all of said carrier medium during said spraying steps and the total time length of said spraying steps is regulated so as not to effect a cure of said resin beyond the viscous state,
   (d) curing the total resulting coating on said metal article by heating it to a temperature and for a time sufficient to effect a substantially complete cure of said resin coating to a solid, and
   (e) cooling said coated article.

2. A method according to claim 1 wherein said curing is effected by heating to a temperature of from 300° to 700° F. for a time of from 1 to 120 minutes.

3. A method according to claim 1 wherein said composition is a 40 to 60 wt. percent solution in a petroleum solvent and is a copolymer of butadiene and 20 to 40 wt. percent of styrene.

4. A method according to claim 1 wherein said composition is a 40 to 60 wt. percent solution in a petroleum solvent and is a copolymer of butadiene and 20 to 40 wt. percent of styrene and has been oxidized.

5. A method according to claim 1 wherein said composition is a 40 to 60 wt. percent solution in a petroleum solvent and is a copolymer of butadiene and 20 to 40 wt. percent of styrene and has been oxidized to an oxygen content of from 5 to 20 wt. percent.

6. A method according to claim 1 wherein said cooling is accomplished by quenching said coated article in a fluid coolant.

7. A method according to claim 1 wherein said metal article is a pipe.

8. A method according to claim 1 wherein the sequence of steps is alternate sprayings of said filler material and said silane-containing resin composition.

9. A method according to claim 1 wherein the sequence of steps is simultaneous spraying of said filler material and said silane-containing resin composition.

10. A method according to claim 1 wherein said article is preheated to 350° to 500° F. immediately prior to coating.

11. A method according to claim 1 wherein said spraying is done in an electrostatic field.

12. A method for coating metal pipes which comprises in combination the steps of:
   (a) spraying said pipe with a composition comprising a thermosetting resin made up of a copolymer of 75 to 80% butadiene and 25 to 15% styrene with about 5 to 20% oxygen incorporated in the copolymer structure in a solvent carrier media until said pipe has received a liquid coating having a dry thickness of from 3 to 8 mils,
   (b) spraying said coated pipe with a finely divided silica having a particle size of from 1 to 100 microns to form a resultant liquid coating comprising said resin composition and said finely divided silica of a total dry thickness equivalent of 3 to 30 mils,
   (c) spraying said pipe with said composition which also contains sufficient partially hydrolyzed organic silane to form from 1 to 5 or more molecular layers on the surface of said silica,
   (d) maintaining the heat of said pipe during said spraying steps so as to maintain it sufficiently hot as to drive off substantially all of said carrier medium and spraying for a time interval insufficient to effect a complete cure of said resin to the solid state,
   (e) curing the total resultant coating on said pipe by heating it to a pipe temperature of from 300° to 700° F. for a time of from 1 to 120 minutes sufficient to effect a substantially complete cure of said resin coating to a solid state, and
   (f) cooling said coated pipe.

13. A method according to claim 12 wherein said finely divided silica material and said silane-containing resin composition are applied simultaneously to said pipe.

14. A method according to claim 12 wherein for some portion of the process, coating layers of said finely divided silica are applied alternately with said silane-containing resin composition and for other coatings, said finely divided silica and said silane-containing resin composition are applied simultaneously.

15. A method according to claim 12 wherein small glass beads are used in place of said finely divided silica.

References Cited

UNITED STATES PATENTS

| 2,930,710 | 3/1960 | Koenecke et al. | 117—29 X |
| 2,967,331 | 1/1961 | Kaspar | 117—93.4 X |
| 2,994,619 | 8/1961 | Eilerman | 117—161 X |
| 3,080,253 | 3/1963 | Dietz et al. | 117—18 X |

FOREIGN PATENTS 710,284  5/1965  Canada.

WILLIAM D. MARTIN, Primary Examiner

W. R. TRENOR, Assistant Examiner

U.S. Cl. X.R.

117—17, 26, 27, 29, 75, 132